US012468551B2

(12) United States Patent
Tibrewal et al.

(10) Patent No.: US 12,468,551 B2
(45) Date of Patent: Nov. 11, 2025

(54) MULTI-SOURCE DEVICE POLICY MANAGEMENT

(71) Applicant: International Business Machines Corporation, Armonk, NY (US)

(72) Inventors: Anjali Tibrewal, Bangalore (IN); Pratyul Kapoor, Bangalore (IN); Akshay Dugar, Bengaluru (IN); Monica Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 17/356,741

(22) Filed: Jun. 24, 2021

(65) Prior Publication Data

US 2022/0413878 A1   Dec. 29, 2022

(51) Int. Cl.
*G06F 8/71*   (2018.01)
*G06F 9/445*   (2018.01)
(Continued)

(52) U.S. Cl.
CPC .......... *G06F 9/44505* (2013.01); *G06F 16/28* (2019.01); *G06F 18/22* (2023.01);
(Continued)

(58) Field of Classification Search
CPC ............ H04N 21/4223; G06F 9/45558; G06F 9/44505; G06F 16/28; G06F 18/22;
(Continued)

(56) References Cited

U.S. PATENT DOCUMENTS

2007/0064270 A1\* 3/2007 Ikegami ................ H04L 67/125
358/1.15
2010/0309318 A1\* 12/2010 Bund ................. H04N 21/4223
348/207.1
(Continued)

FOREIGN PATENT DOCUMENTS

CN          106850259 B      12/2019

OTHER PUBLICATIONS

JP 5503594, "System, Method And Apparatus For Virtualization TPM Access", (translation), May 28, 2014, 13 pgs <JP_5503594.pdf>.\*
(Continued)

*Primary Examiner* — Tuan A Vu
(74) *Attorney, Agent, or Firm* — Robert Richard Aragona; Andrew D. Wright; Calderon Safran & Wright P.C.

(57) ABSTRACT

A method, system, and computer program product for correlating dynamic device configurations from multiple sources. The method may include identifying device management settings from a device management system. The method may also include receiving source settings from a second source. The method may also include analyzing individual words from the device management settings and the source settings. The method may also include analyzing strings, integers, and Booleans from the device management settings and the source settings. The method may also include identifying, based on the analyzing individual words and the analyzing strings, integers, and Booleans, corresponding settings from the device management settings and the source settings. The method may also include determining that the corresponding settings are conflicting settings. The method may also include flagging, based on the determining, conflicts of the corresponding settings.

20 Claims, 6 Drawing Sheets

(51) Int. Cl.
*G06F 16/28* (2019.01)
*G06F 18/22* (2023.01)
*G06N 5/04* (2023.01)
*G06N 20/00* (2019.01)
*G06F 9/455* (2018.01)
*G06F 16/2455* (2019.01)
*G06F 40/279* (2020.01)
*H04L 9/40* (2022.01)
*H04L 43/0805* (2022.01)
*H04N 21/4223* (2011.01)

(52) U.S. Cl.
CPC ............... *G06N 5/04* (2013.01); *G06N 20/00* (2019.01); *G06F 9/45558* (2013.01); *G06F 16/24558* (2019.01); *G06F 40/279* (2020.01); *H04L 43/0805* (2013.01); *H04L 63/20* (2013.01); *H04N 21/4223* (2013.01)

(58) Field of Classification Search
CPC . G06F 16/24558; G06F 40/279; H04L 63/20; H04L 43/0805; H04L 41/082; H04L 67/125; G06N 20/00; G06N 9/545
See application file for complete search history.

(56) References Cited

U.S. PATENT DOCUMENTS

| | | | |
|---|---|---|---|
| 2015/0032867 A1* | 1/2015 | Lihosit | H04L 41/082 709/221 |
| 2015/0058920 A1* | 2/2015 | Burghart | H04L 63/20 726/1 |
| 2017/0300351 A1* | 10/2017 | Dhawan | G06F 9/45558 |
| 2019/0289058 A1* | 9/2019 | Bhoj | H04L 43/0805 |
| 2020/0012648 A1* | 1/2020 | Fink | G06F 16/24558 |
| 2020/0120142 A1 | 4/2020 | Maynard et al. | |
| 2020/0137097 A1 | 4/2020 | Zimmerman et al. | |
| 2020/0241871 A1 | 7/2020 | Sharma et al. | |
| 2020/0252270 A1 | 8/2020 | Cung | |
| 2020/0401613 A1* | 12/2020 | Rogynskyy | G06F 16/28 |
| 2021/0264107 A1* | 8/2021 | Kandel | G06F 40/279 |

OTHER PUBLICATIONS

Lv Zhi-hui et al, CN 104092565, (translation) Mar. 29, 2017, 17 pgs <CN_104092565.pdf>.*
Zheng Jian, CN 112671569A (translation), Apr. 16, 2021, 10 pgs <CN_112671569A.pdf>.*

* cited by examiner

```xml
<name>androidMDM.workAllowCamera</name>
<productcode>ANDROID_MDM</productcode>
<category>AW Settings</category>
<complexity>BASIC</complexity>
<paramtype>Basic</paramtype>
<subtype>Boolean</subtype>
<valtype>Single</valtype>
<descriptions>
  <description language="en">To enable camera on device, camera app needs to be whitelisted in native app compliance apart from enabling this.</description>
</descriptions>
<defvalues>
  <value>TRUE</value>
</defvalues>
<displayTexts>
  <disptext language="en"><![CDATA[Allow camera]]></disptext>
</displayTexts>
```

550

```json
"nestedRestriction": [
  {
    "entry": [ "Off", "On" ],
    "restrictionType": "choice",
    "description": "Specifies whether the back camera can be used to take pictures",
    "entryValue": [ "2", "1" ],
    "title": "Camera Configuration - Use Of Back Camera",
    "key": "cameraUseOfBack"
  },
  {
    "entry": [ "Off", "On" ],
    "restrictionType": "choice",
    "description": "Specifies whether the front camera can be used to take pictures",
    "entryValue": [ "2", "1" ],
    "title": "Camera Configuration - Use Of Front Camera",
    "key": "cameraUseOfFront"
  },
  {
    "entry": [ "Off", "On" ],
    "restrictionType": "choice",
    "description": "Specifies whether the imager can be used to take pictures",
    "entryValue": [ "2", "1" ],
    "title": "Camera Configuration - Use Of Imager",
    "key": "cameraUseOfImager"
  }
],
"description": "Specifies Camera configuration to be performed as part of this OemConfig Step",
"title": "Camera Configuration",
"key": "cameraStep"
```

MULTI-SOURCE DEVICE POLICY MANAGEMENT

BACKGROUND

The present disclosure relates to device management systems and, more specifically, to correlating dynamic device configurations from multiple sources using machine learning and text analytics.

Device management services are used to administer, manage, and monitor devices and their policies. These services are particularly helpful when third-party products are used through a device that is not owned by the third-party, as the device management services may help the third-party manage their policies on those devices (e.g., mobile devices—such as cell phones, laptop computers, tablets, etc., desktop computers, printers, and other devices). Device management services include services such as mobile device management (MDM), enterprise mobility management (EMM), and unified endpoint management (UEM). MDM software manages and monitors mobile devices to make sure their policies and settings are in line with the requirements and limitations of the third-party and third-party product(s). EMM is similar to MDM but may include even more capabilities, such as being able to monitor and manage bring your own device(s) (BYOD). UEM is similar to both MDM and EMM and encompasses both MDM and EMM. Specifically, UEM refers to any tools, applications, or other software that are used to monitor, administer, and manage (for example, through the third-party from a central location) devices. UEM may include mobile devices, BYODs, and other endpoint devices (such as desktop computers, printers, etc.).

SUMMARY

The present invention provides a computer-implemented method, system, and computer program product to correlate dynamic device configurations from multiple sources. The method may include identifying device management settings from a device management system. The method may also include receiving source settings from a second source. The method may also include analyzing individual words from the device management settings and the source settings. The method may also include analyzing strings, integers, and Booleans from the device management settings and the source settings. The method may also include identifying, based on the analyzing individual words and the analyzing strings, integers, and Booleans, corresponding settings from the device management settings and the source settings. The method may also include determining that the corresponding settings are conflicting settings. The method may also include flagging, based on the determining, conflicts of the corresponding settings. The system and computer program product include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a schematic diagram of code of different device policies, according to some embodiments.

Figure 1:
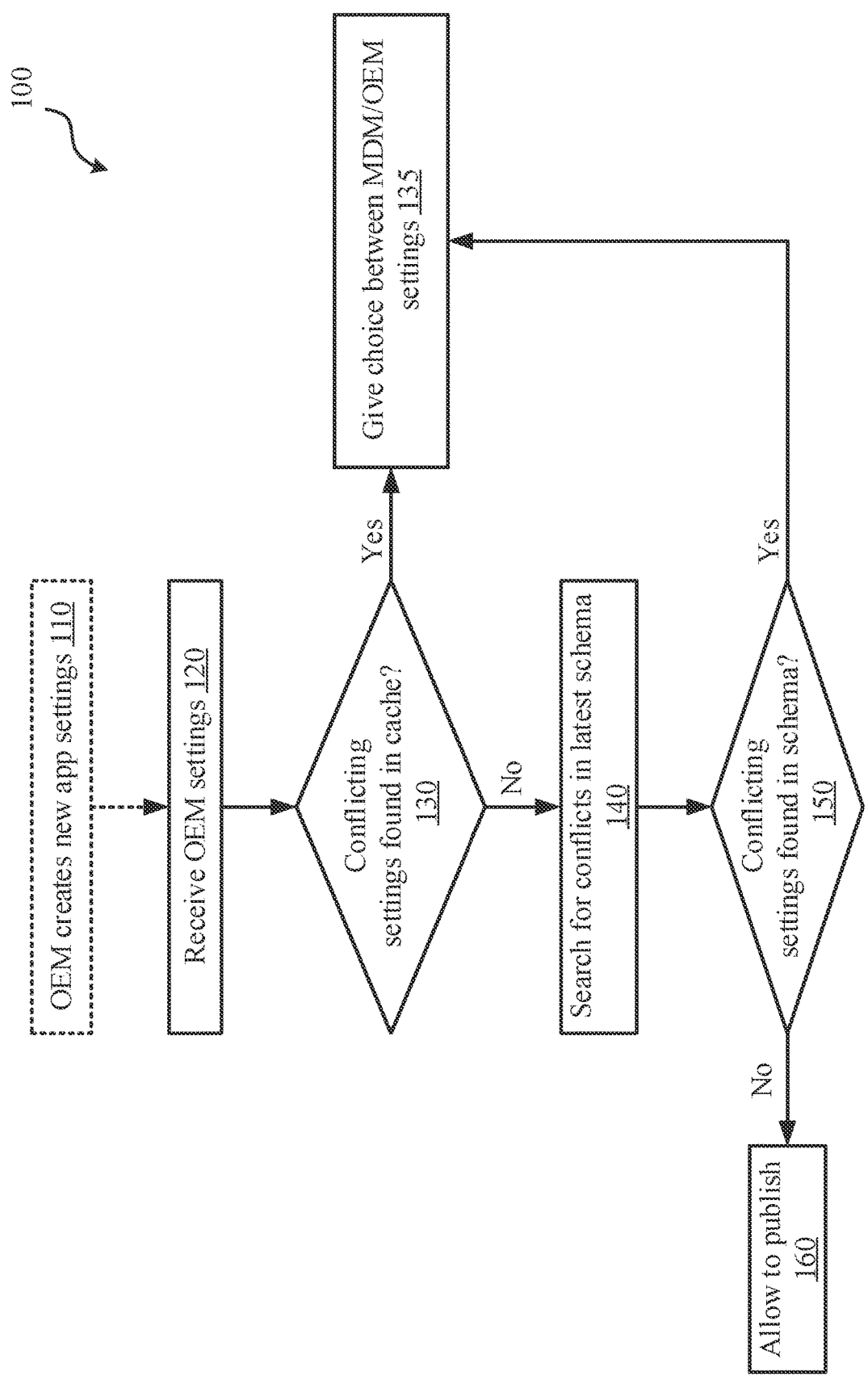
FIG. 1 depicts a flowchart of a first set of operations for automatically correlating device settings across multiple devices, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

There are various conventional device management systems that help manage policies on a device, such as mobile device management (MDM) systems, enterprise mobility management (EMM) systems, and unified endpoint management (UEM) systems. These management systems may simplify the management of various devices and may help enforce and enhance security measures across the devices (for instance, when third-party products or applications are run on a user device, such as when business applications are run on a personal device). However, original equipment manufacturers (OEMs) continuously release new settings and features (for example, with new versions of the operating system, updates to applications, additions of new applications, etc.) and it may be difficult for the device management systems to keep upgrading and supporting the new features while keeping the features in line with the requirements set forth by administrators of the device management system(s).

For example, if an email application on a personal cell phone was being used for business purposes, the business may utilize a device management system to ensure the email application, when used for business purposes, meets the privacy requirements of the business. In this example, the business may not want images exchanged via email therefore the device management system may enforce a no image policy on the email application on the mobile device when the email application is used for business purposes. However, in this example, the email application itself may have a setting that allows for images to be exchanged, which may conflict with the setting/policy from the business. Therefore, it may be difficult for the device management system to support the image features of the email application while also meeting the no image requirement from the business.

OEMs may introduce new policies, functions, features, etc. that can be deployed on devices using an application (such as an OEMConfig application). In some instances, the schema provided by each OEM may be dynamic and may have a complex structure. Because the schemas may be complex, it may be easy to miss conflicts between existing policy configurations supported by the device management systems and the schema and there may not initially appear to be any correlation between the two. This may result in system administrators configuring conflicting values or settings for each. In conventional policy configurations and OEM configurations, the configurations may be applied via parallel streams that are independent of each other. This may result in inconsistencies, as there are conflicts between the two streams (due to the conflicting policies) and system administrators may not be able to predict the state of settings on the device. This may also cause additional issues with the device.

The present disclosure provides a computer-implemented method, system, and computer program product to correlate dynamic device configurations from multiple sources. Specifically, the method, system, and computer program product may take these configurations or settings (coming from the multiple sources) and may come up with suggestions on ways to handle the conflicts between the different configurations/settings. In some instances, the dynamic devices may be automatically (e.g., autonomously and substantially immediately) correlated using machine learning and text analytics. Once all the configurations across the different management systems are correlated, the system may provide the system administrator with a single interface for these considerations. The system may highlight conflicts for the same configuration across the different management systems to the administrator, and may automatically handle/resolve the conflicts. In some instances, the system administrator may define a precedence order for the different management systems and the system may resolve the conflicts based on the precedence order.

Figure 6:
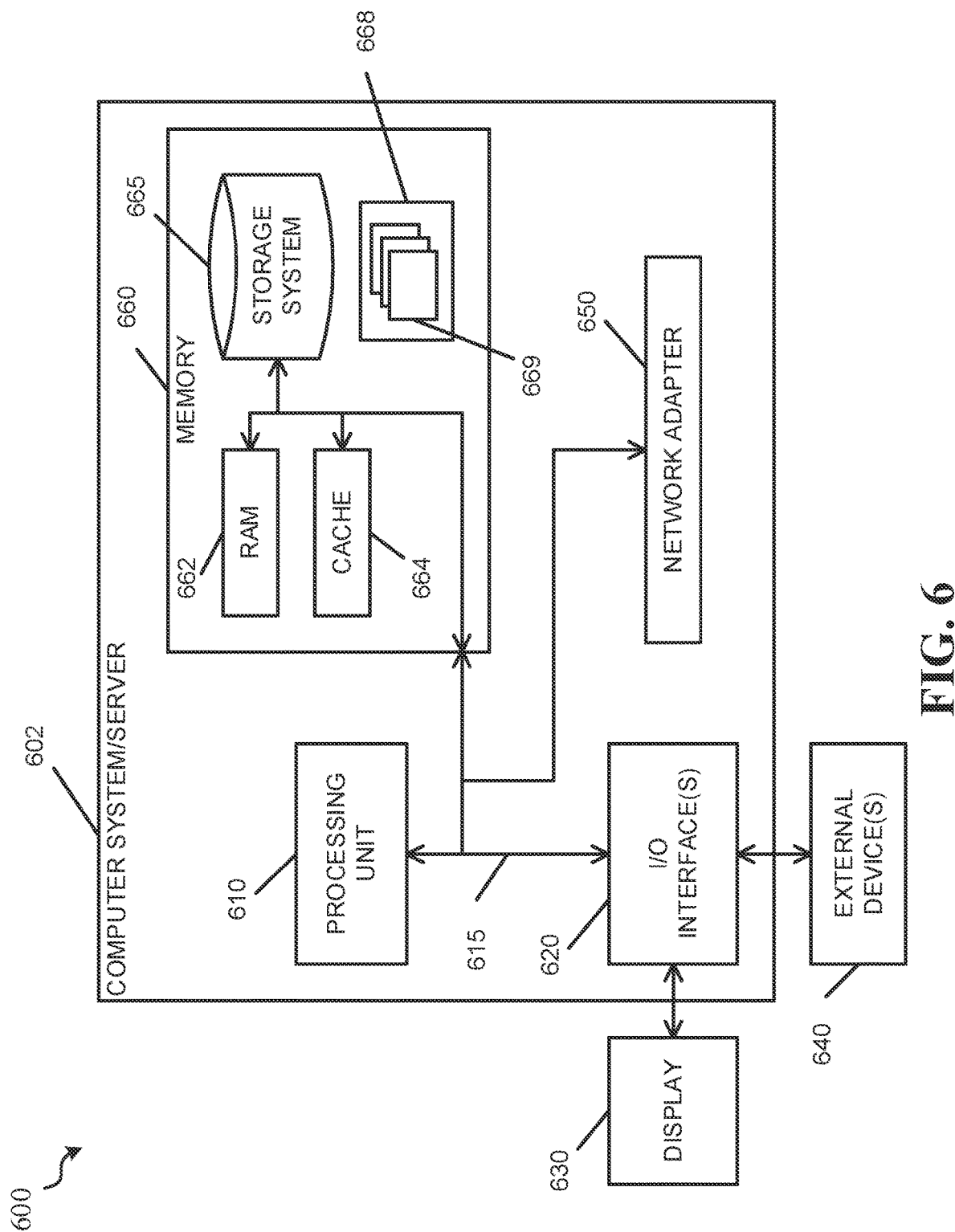
FIG. 6 depicts a block diagram of a sample computer system, according to some embodiments.

Referring now to FIG. 1 a flowchart of an example method 100 for automatically correlating device settings across multiple devices is depicted, according to some embodiments. In some embodiments, the method 100 is implemented as a computer script or computer program (e.g., computer executable code) to be executed by a server on or connected to a computer system (e.g., computer system 600 (FIG. 6)). In some embodiments, the server is a computer device, such as computer system/server 602 (FIG. 6).

When new settings are introduced, the settings may need to be compared to the policies, settings, etc. required by the device management system. For example, the device management system may be enforcing policies and/or settings established by a company for when conducting business. These policies and/or settings may be enforced on devices (for example, a laptop, cell phone, tablet, BYOD, desktop computer, printer, etc.) that are used to conduct business for the company. However, in some instances, the settings of various applications being executed on the device (for example, settings from the OEM) may conflict with the settings required by the device management system. In conventional systems, the settings may be complex and it may be difficult to catch when the settings are conflicting. When it is not caught that the settings conflict, the settings may be executed in parallel streams, which may result in inconsistencies and errors when using the corresponding application(s). Therefore, method 100 is an exemplary method of identifying/determining when there are conflicting settings, and resolving the conflict before implementing the new settings, policies, etc. This method 100 may be executed using a single interface through the device management system, in some instances, in order for the device management system to easily and promptly resolve any conflicts between settings from various sources.

Figure 2:
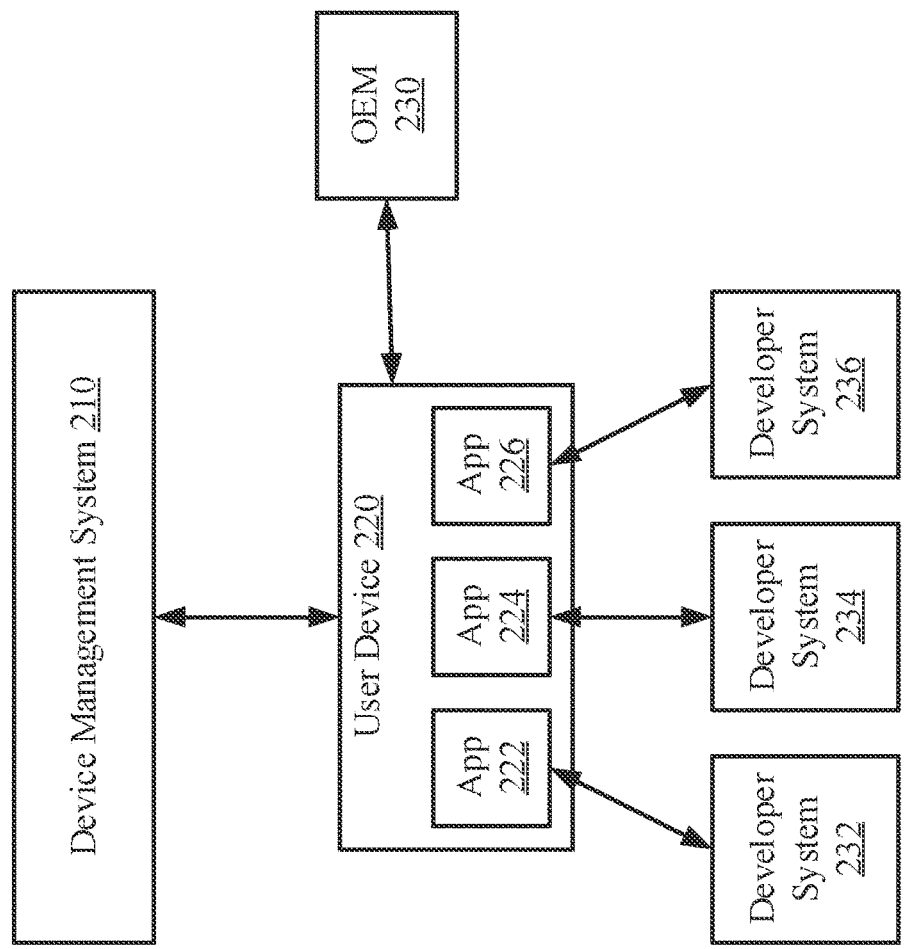
FIG. 2 depicts a schematic diagram of an example device management system environment, according to some embodiments.

Prior to the start of method 100, an OEM may introduce new policies, functions, features, etc. that will be deployed on a user device. FIG. 1 depicts an exemplary instance where the OEM creates new application settings that for an application that is downloaded on the user device. This is depicted by operation 110. This operation is depicted with a dotted line because it is an optional feature of method 100. In some instances, for example, operation 110 could be conducted by the OEM, whereas the remainder of the operations (120-160) would be conducted by a device management system such as device management system 210 (FIG. 2). However, prior to the execution of operations 120-160, new policies, functions, features, settings, etc. are created, and these settings are what will be compared to the device management settings (discussed further, herein).

An OEM (original equipment manufacturer) is the manufacturer of the device and/or components of the device. Once a device has been produced and released to the public, there may be various updates and/or new releases from the OEM (for example, software updates and/or releases) to help make sure the device continues to work properly, to add new features for the device, to improve the device execution, etc. These updates/releases may be transmitted to the device itself so that the device can implement the updates/releases.

Although operation 110 discusses new application settings from an OEM, this is just one example of new policies, settings, updates, etc. that are released from a second source (i.e., a source that is not the device management system) and any new policies, settings, updates, etc. that are released from a second source may be used in method 100. In other examples, an application developer may release updates for an application installed on a user device, a new web browser may be downloaded onto the user device (and the new web browser may have its own policies, settings, etc.), a new version of an operating system may be downloaded onto the user device, etc.

Method 100 includes operation 120 to receive the new OEM settings (that were created in operation 110). OEM settings are just one example of new policies, settings, updates, etc. that may be received in operation 120. In some embodiments, method 100 may be performed when provisioning a new device, adding an employee's personal device to a work environment, etc. In these instances, operation 120 may include receiving the device settings for the new and/or added device.

As mentioned above, the OEM (or other source of the updates/policies/settings) may transmit the updates to the user device so that the user device is able to download and implement the new updates. However, when a device management system is utilized (such as device management system 210 (FIG. 2)), the user device (such as user device 220 (FIG. 2)) may transmit the updated settings to the device management system prior to executing the updated settings on the user device, in some instances.

Method 100 includes operation 130 to determine whether there are any conflicting settings found in the cache. The cache, as referred to herein, may refer to the cache in the device management system and/or in the computer application that is doing the similarity analysis (discussed further herein). The cache may contain a known list of settings and any known conflicts. Therefore, operation 130 may determine whether any of the known settings in the cache are conflicting settings. However, since the settings may change dynamically, the previously stored conflicts (in the cache) may no longer be accurate. Therefore, the schema is also checked (in operation 140) to see if there are any new settings. Whenever there are new settings in any involved systems, the schemas of these new systems would be looked up to recalculate the new set of conflicts. In some instances, the new settings from the schema may be added to the cache so they are included in the known list of settings.

Once the new OEM settings are received by the device management system, the device management system may compare the OEM settings to the settings that the device management system has been programmed to enforce, which may be referred to as DM (device management) settings. In operation 130, the OEM settings may be compared to the DM settings stored in the cache. In some instances, the DM settings may be limitations on allowable settings for the user device. For example, the device management system may not allow the user device to access certain websites, therefore the DM settings may include a setting to not access the certain websites.

In some embodiments, text analytics and machine learning are used to derive similarity measures (to determine the similarity between two different settings) and intelligently and accurately compare policy settings from different systems. For instance, through text analytics and machine learning, the device management system may determine a similarity value that indicates the similarity between two different settings. This similarity value may be compared to a conflict threshold to determine whether the settings are conflicting. For example, if the similarity value of the two settings is greater than or equal to the conflict threshold, the settings may be considered similar and not conflicting. However, if the similarity value is below the conflict threshold, the two settings may be considered conflicting. In some instances, the conflict threshold may be a predetermined value set by a system administrator. In some instances, the conflict threshold may be determined using machine learning. In some instances, the conflict threshold may initially be a predetermined value, however the conflict threshold may be updated and improved through machine learning (for instance, once additional data is gathered). When settings are determined to be conflicting settings, they may be flagged as conflicting settings so that action can be taken before both settings are implemented on the user device.

In some instances, prior to determining a similarity value of the two settings, it may first be determined whether the two settings are corresponding settings. For example, a device management (DM) setting is that files are not allowed to be exchanged over a messaging application. In this example, an OEM setting is that only images up to 100 megabytes are able to be stored on the user device. In this example, the OEM setting relates to storage on the device and the DM setting relates to files being exchanged over a messaging application, therefore the settings relate to two different areas of the user device and do not correspond to each other. For instance, the size of the image file stored on the computer does not relate to whether or not files can be exchanged over a messaging application. If the DM setting indicated that image files were not able to be stored on the user device, this setting would relate to the OEM setting that indicated that images up to 100 megabytes could be stored on the user device, as both settings relate to storing data, specifically storing images, on the device.

If settings do not correspond or relate to each other, then they may end up having a similarity value below the conflict threshold, as the settings are completely different settings. This may result in settings being flagged as conflicting when they are not conflicting settings and are instead completely different settings. Therefore, prior to determining the similarity value, the settings may be compared and a correspondence value may be determined (for instance, in a similar manner as the similarity value) in order to determine whether the two settings are corresponding (i.e., related) settings. Determining whether there are conflicting settings is discussed further herein in relation to FIG. 3.

If there are conflicting settings in the cache (in operation 130), the device management system gives the system administrator the choice between the conflicting settings in operation 135. As discussed above, if the device management settings and the OEM settings (or any settings from a second source) are conflicting, action needs to be taken to make sure that these conflicting settings are not both executed, which would cause issues for the user device, the device management system, etc. In operation 135, this action includes giving the system administrator (for example, the administrator of the device management system and/or the administrator of the user device) the choice between the conflicting settings. Whichever setting the administrator chooses may be the setting implemented by the user device.

There may be other actions (not depicted) that the device management system may take if the settings are conflicting in place of (or, in some instances, in addition to) operation 135. For instance, the device management setting may be automatically implemented. In some instances, the device management setting may be a setting established by an owner of the device that is being used by a user, and the owner may want the device to always implement their settings. In some instances, a system administrator may set predetermined priority settings and/or a priority/precedence order, and when the conflicting device management setting is a priority setting the device management setting may be implemented, but when the conflicting device management setting is not a priority setting the OEM setting may be implemented. For example, the priority settings may be settings related to privacy for confidential information. Therefore, in this example, settings that relate to a size of files that can be stored on the device may not be a priority setting but settings that relate to sharing information with others may be priority settings. In this example, when there are conflicting settings relating to privacy (which are the priority settings), the device management settings may automatically be selected as these settings are a priority for the device management system to enforce. However, in this example, when there are conflicting settings that do not relate to privacy (so they are not priority settings), the OEM settings may be selected and enforced on the user device.

In some instances, when new settings, policies, updates, etc. are created (for example, new OEM settings) they are found in the user device cache. Therefore, operation 130 may first look at the new OEM settings in the cache and determine whether any of the settings found in the cache conflict with the device management (DM) settings. However, in some instances, new settings may also be found in a schema or policy definition. For example, the OEM may create a new application and the new application will have a schema or a policy definition. The device management system may be able to pull the schema and analyze it, in some instances.

Therefore, if there are not conflicting settings in the cache (in operation 130), method 100 proceeds to operation 140 to search for conflicts in the latest schema or policy definition. As discussed above, even though there are not conflicting settings in the cache, there may still be conflicting settings found in the latest schema. Therefore, before determining that there are no conflicts (discussed further herein in relation to operation 160), the device management system may first determine whether any settings in its schema conflict with the new OEM setting. This may be done using the same/similar methods as discussed above in relation to operation 130.

Method 100 proceeds to operation 150 to determine whether there are conflicts found in the schema. Although operation 150 is depicted as after operation 140, operation 140 and 150 may be executed simultaneously. For instance, while the schema is being checked for conflicts, it may also be determined whether there are any conflicts found. In some embodiments, determining whether there are any conflicts found in the schema may be done using the same/similar methods as determining whether there are conflicts found in the cache (i.e., operation 130). For instance, a device management setting found in the schema may be compared to the OEM setting to determine whether the two settings are corresponding settings and, if they are corresponding settings, determine whether the two settings are similar or conflicting. This may be discussed further herein in relation to FIG. 3.

If there are conflicts found in the schema (in operation 150), method 100 proceeds to operation 135 to give the system administrator the choice between the conflicting settings. This is discussed further above.

If, in operation 150, there were no conflicts found in the schema, then the new settings from the OEM and the settings from the device management system (e.g., the MDM) are not conflicting and there are no issues. If this is the case, the new application settings created by the OEM (in operation 110) can publish in operation 160 and can become a new policy for the application on the user device.

Referring to FIG. 2, a schematic diagram of an example device management environment 200 is depicted, according to some embodiments. Device management environment 200 includes a device management system 210 and a user device 220. The user device 220 is a device (e.g., laptop, cell phone, tablet, BYOD, desktop, printer, etc.) that is used by a user. The device management system 210 is a system (e.g., MDM, EMM, or any other UEM) that monitors and manages the user device 220 to make sure that the device 220 stays in line with policies and requirements established by a third-party (for example, an owner of the user device 220). Device management environment 200 also includes an OEM (original equipment manufacturer) 230 that was the manufacturer of the user device 220. As discussed herein, there may be various new settings, updates, policies, etc. that may be released from the OEM 230 to be implemented on the user device 220.

User device 220 includes three applications, application 222, application 224, and application 226, that are executed on user device 220. For example, application 222 may be an email application, application 224 may be a web browser, and application 226 may be a typing application. Although only three applications (222, 224, and 226) are depicted, user device 220 may execute any number of applications. Each application 222, 224, and 226 may have been originally developed by separate systems. These are represented by developer system 232, developer system 234, and developer system 236. For instance, developer system 232 may have developed application 222, developer system 234 may have developed application 224, and developer system 236 may have developed application 226. In some instances, the developer systems 232, 234, and 236 may release updates for the applications 222, 224, and 226. These updates (and their corresponding settings) may be compared to the settings from the device management system 210 to determine whether any developer settings conflict with the device management settings.

In some embodiments, device management system 210 executes method 100 (FIG. 1). The OEM settings discussed in FIG. 1 may be created by OEM 230 and transmitted to user device 220. Although method 100 and FIG. 1 discuss OEM settings, method 100 may also be applied to other settings, policies, updates, etc. received by any other second source, such as developer system 232, developer system 234, and/or developer system 236. The new settings, policies, updates, etc. from any second source (including developer systems 232, 234, and 236, and OEM 230) may be referred to herein as source settings.

Figure 3:
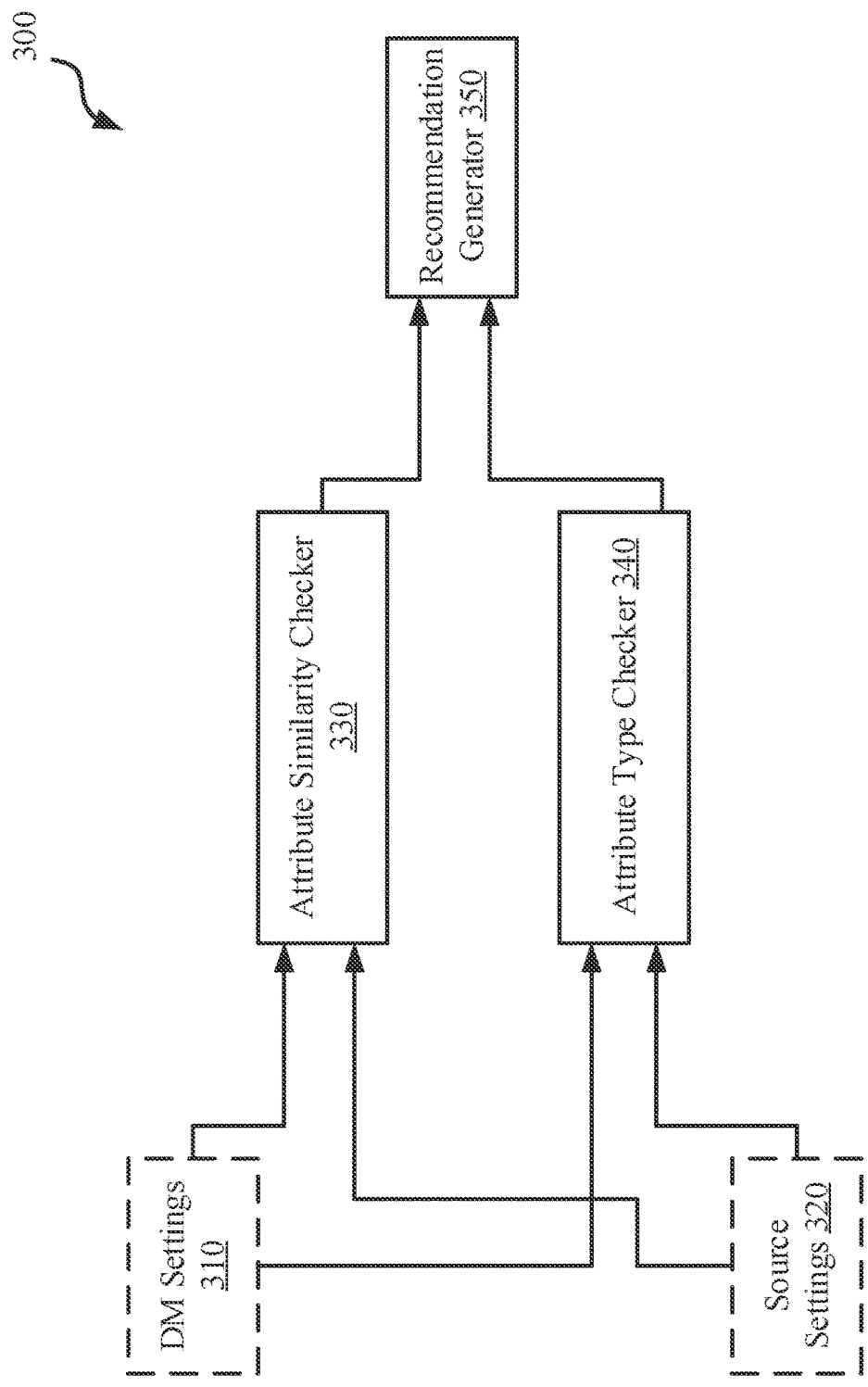
FIG. 3 depicts a schematic diagram of a correlation process, according to some embodiments.

Referring now to FIG. 3, a schematic diagram of a correlation process 300 is depicted, according to some embodiments. Correlation process 300 includes inputting device management (DM) settings 310 and source settings 320 into an attribute similarity checker 330 and an attribute type checker 340. Attribute similarity checker 330, attribute type checker 340, and recommendation generator 350 may all be components of a device management system (such as device management system 210 (FIG. 2)). The DM settings 310 may be settings, policies, updates, etc. that the device management system has been instructed or programmed to enforce on a user device (such as user device 220 (FIG. 2)). The source settings 320 may be settings, policies, updates, etc. that have been transmitted from a second source (such as developer system 232, 234, 236, and/or OEM 230 (FIG. 2)) to be implemented on a user device (such as user device 220).

In some embodiments, attribute similarity checker 330 compares the words of the DM settings 310 and the source settings 320 and attribute type checker 340 compares the Booleans, strings, and/or integers of the DM settings 310 and the source settings 320. The lengths of text of the DM settings 310 and the source settings 320 may be different and, in some instances, the settings may be in different forms, therefore having two different checkers (the attribute similarity checker 330 and the attribute type checker 340) that check different things helps increase the accuracy of determining when there are conflicting settings and helps prevent conflicting settings from being missed, which could cause issues and errors for the user device.

The attribute similarity checker 330 checks each individual word of the settings and compares individual words of the DM settings 310 to the words of the source settings 320. Specifically, the attribute similarity checker 330 may apply machine learning models and text analytics to check for similar words (for example, synonyms), opposite words (for example, antonyms, inverted words, etc.), and any other relationships between words. In some instances, because the text of the settings (DM settings 310 and source settings 320) may be concise and technical, word embeddings may not be required to be checked for. Word embeddings are a type of word representation that allows words with similar meaning to have a similar representation. For example, a word embeddings approach may give a similar or same representation to the words "good" and "great," which are lexicographically different but semantically similar. In these instances, instead of using word embedding where "good" and "great" may be given similar or same representations, the two words may be given different representations but may be identified as synonyms through the machine learning models and text analytics. The attribute similarity checker 330 may transmit its findings to the recommendation generator 350.

In some embodiments, attribute type checker 340 checks Booleans, strings, and integers of the DM settings 310 and source settings 320, and compares them. A Boolean is a variable and/or value that represents true or false. For example, setting code (i.e., code indicating the setting) may state "<value>TRUE</value>." This may be a Boolean and may be analyzed through the attribute type checker 340. In addition, the attribute type checker 340 checks the strings of the settings (310 and 320). Strings of settings may be an array of characters and/or words. For example, a string of settings may be "<paramtype>Basic</paramtype>." By analyzing setting strings, in addition to the individual words analyzed by attribute similarity checker 330, context of the words may be determined and considered when determining whether settings are similar. For example, a string of settings may be "camera access: yes." Considering each word individually may indicate that there is a setting related to "camera," there is a setting related to "access," and that there is a "yes" setting, but may not give enough information on what the actual setting is. However, when considering the text string "camera access: yes," it may be determined that camera access is allowed, which is a more complete setting that may be compared to other settings. Similar to attribute similarity checker 330, attribute type checker 340 may transmit its findings to the recommendation generator 350.

The recommendation generator 350 analyzes the reports and findings from the attribute similarity checker 330 and the attribute type checker 340 and determines whether the DM settings 310 and the source settings 320 are conflicting. In some embodiments, the recommendation generator 350 generates similarity values between the DM settings 310 and the source settings 320 using the findings from the attribute similarity checker 330 and the attribute type checker 340. There may be a similarity value generated for each corresponding or comparable setting between the DM settings 310 and the source settings 320. Each similarity value may be compared to a conflict threshold value to determine whether the settings are in conflict. The conflict threshold may be a predetermined value set by a system administrator of the device management system. In some instances, the conflict threshold may be determined using machine learning. In some instances, the conflict threshold may initially be a predetermined value, however the conflict threshold may be updated and improved through machine learning (for instance, once additional data is gathered).

In some embodiments, prior to determining a similarity value of the two settings, the recommendation generator 350 may first determine whether the two settings are corresponding settings. To determine whether settings are corresponding settings, the recommendation generator 350 may use the findings from the attribute similarity checker 330 and the attribute type checker 340 to generate a correspondence value that indicates how much the two settings correspond to each other. The correspondence value may be compared to a correspondence threshold to determine whether the two settings are considering corresponding settings. The correspondence threshold may be predetermined by an administrator, determined using machine learning, a combination of the two, or using any other method of determining a threshold value. In some instances, if the correspondence value is greater than or equal to the correspondence threshold, the two settings are determined to be corresponding settings.

For example, a DM setting 310 may state "<name>persona.workplace.restrictScreenshot </name>" which indicates that screenshots are restricted. In this example, there may be a OEM setting that states "<name>intune.screenCaptureBlocked</name>" which indicates that screen captures are blocked. The recommendation generator 350 may analyze the reports and findings from the two attribute checkers (330 and 340) and it may be determined that the two settings are 0.91 corresponding. 0.91 is the correspondence value in this example. The correspondence value may also be expressed as 91%, 91 (out of 100), 9.1 (out of 10), 91/100, etc. The settings may be determined to be 0.91 corresponding as both settings involve very similar subjects (e.g., screen capture and screenshot) but the subjects are not quite identical. In this example, there may be a correspondence threshold of 0.85, and because the correspondence value of 0.91 is above the correspondence threshold of 0.85, the settings may be determined to be corresponding settings.

Once it is determined that the settings are corresponding settings, the similarity between the two settings may be determined. As discussed herein, of the settings are not corresponding settings, they may always be found to be "conflicting," as they are not similar settings. However, the settings may not actually be conflicting, and may instead just be dissimilar. Determining whether corresponding settings are conflicting may help prevent dissimilar settings from being flagged as conflicting.

Continuing the above example, the recommendation generator 350 may determine that the two settings are 0.88 similar. 0.88 is the similarity value in this example. The similarity value may also be expressed as 88%, 88 (out of 100), 8.8 (out of 10), 88/100, etc. The settings may have been found to be 0.88 similar because when looking at the overall string, the express similar sentiments that screenshots/screen captures are not allowed, however a lot of the actual words used (e.g., screenshot vs. screen capture, restrict vs. blocked, etc.) are different. However, in this example, the conflict threshold is 0.80, therefore the similarity value of 0.88 is higher than the conflict threshold of 0.80, indicating that the two settings are similar and there is no conflict between the settings. In this example, both the DM setting 310 and the OEM setting 320 can be applied to a user device, as the two settings do not conflict with each other.

If the DM settings 310 and the OEM settings 320 are determined to not conflict (which is the case in the above example), the recommendation generator 350 may generate an instruction to apply both settings to the user device.

In some embodiments, if the DM settings 310 and the OEM settings 320 are conflicting, the recommendation generator 350 may generate an instruction to automatically apply the DM settings 310. In some instances, an administrator of the device management system may instruct the system to always apply the device management settings 310 if there is any conflict between the DM settings 310 and the source settings 320. This may help ensure that the regulations set by the administrator and/or other device management users are always followed. However, the source settings 320 may be settings that help prevent issues with the device itself, or applications on the device, therefore always executing DM settings 310 may not always be the best for the user device itself. For example, a source setting 320 may be to automatically save a document. This setting may prevent the device from losing files/documents if the device crashes. However, in this example, a DM setting 310 may be to only save a document if a user manually saves the document. This setting may prevent confidential documents from being stored if they are not intended to be stored, however it may also result in important documents being lost if the user device crashes without the document being saved. In this example, although the DM setting 310 may improve confidentiality, it may not necessarily be the best setting for the user and the user device.

Therefore, in some embodiments, if the DM settings 310 and the OEM settings 320 are conflicting, the recommendation generator 350 may generate and transmit an inquiry to the administrator of the device management system, asking the administrator to select either the DM setting 310 or the source setting 320 to be implemented on the user device. This allows the system administrator to choose the preferred setting for the user device. In some instances, the recommendation generator may recommend a setting but may give the system administrator the choice between the recommended setting or the other setting.

In some embodiments, the system administrator may set predetermined priority settings, and when the conflicting device management setting is a priority setting the device management setting may be implemented, but when the conflicting device management setting is not a priority setting the OEM setting may be implemented. For example, the priority settings may be settings related to privacy for confidential information. Therefore, in this example, settings that relate to a size of files that can be stored on the device may not be a priority setting but settings that relate to sharing information with others may be priority settings. In this example, when there are conflicting settings relating to privacy (which are the priority settings), the device management settings may automatically be selected as these settings are a priority for the device management system to enforce. However, in this example, when there are conflicting settings that do not relate to privacy (so they are not priority settings), the OEM settings may be selected and enforced on the user device.

Figure 4:
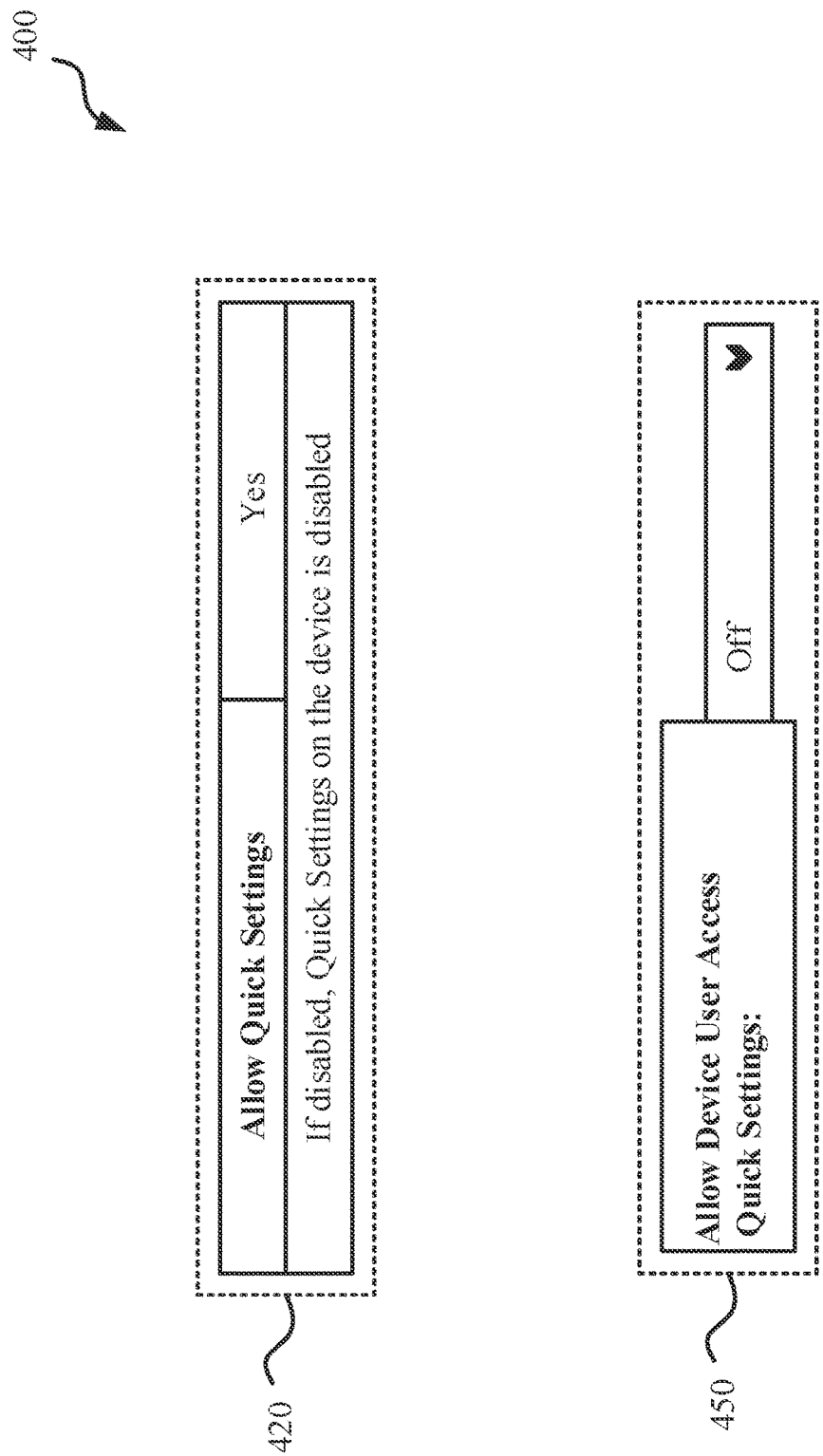
FIG. 4 depicts a schematic diagram of different device settings, according to some embodiments.

Referring to FIG. 4, a schematic diagram of example device settings 400 are depicted, according to some embodiments. Device settings 400 include a device setting 420 from a first source (e.g., the device management system) and a device setting 450 from a second source. For example, device setting 420 may be from an EMM provider (or another UEM provider, such as an MDM) and device setting 450 may be from an OEM configuration application. Device setting 420 indicates that quick settings are allowed on the user device. However, device setting 450 indicates that allow device user access quick settings is off and quick settings are not allowed. Using the methods discussed herein, it may be determined that the settings 420 and 450 are comparable settings, because they both discuss quick settings, but that the settings are conflicting settings because setting 420 allows quick settings and setting 450 does not allow quick settings.

In some embodiments, setting 420 may be automatically implemented because setting 420 is the device management setting. In some embodiments, a system administrator is given the choice between setting 420 and setting 450 and chooses which setting to implement on the user device. In some embodiments, the device management system determines whether allowing quick settings is a priority setting, and if it is a priority setting, the device management system selects setting 420, as it is the device management setting. In this instance, if settings related to quick settings are not priority settings, the device management system may automatically implement setting 450, as setting 450 may be the source setting and/or OEM setting.

Referring to FIG. 5, a schematic diagram of code of device policies 500 are depicted, according to some embodiments. Device policies 500 include two different camera policies (policy 520 and policy 550). In some embodiments, policy 520 is a device management policy and policy 550 is a source policy. These device policies/settings may be compared using method 100 (FIG. 1), in some instances. In some embodiments, an attribute similarity checker (such as attribute similarity checker 330 (FIG. 3)) may check and compare each individual word from policy 520 and policy 550. In addition, an attribute type checker (such as attribute type checker 340 (FIG. 4)) may check and compare the strings, integers, and/or Booleans of policy 520 and policy 550. For example, "<subtype>Boolean</subtype>" and "<value>TRUE</value>" may be Booleans in policy 520 and they may be analyzed by an attribute type checker. However, "subtype" "Boolean" and "subtype" may all be analyzed as individual words using an attribute similarity checker. Further, "<description language="en"> To enable camera on device, camera app needs to be whitelisted in native app compliance apart from enabling this. </description>" may be analyzed as a single string in the attribute type checker, but each word may be analyzed individually in the attribute similarity checker.

Device policy 520 includes a policy stating "<name>androidMDM.workAllowCamera </name>" indicating that the camera is allowed by MDM. However, policy 550 states that "restrictionType": "choice","description": "Specifies whether the back camera can be used to take pictures" and "restrictionType": "choice","description": "Specifies whether the front camera can be used to take pictures." These sections of code indicate that it is the user's choice whether the back camera and/or the front camera are allowed and can be used. The settings from the two policies (520 and 550) are compared and it may be determined that the two settings are conflicting, as always allowing the camera is different than allowing the user to choose whether the camera is allowed. Because the settings are conflicting, both policies 520 and 550 cannot be executed (at least not in their entirety) as the conflicting settings from the policies may cause errors and other issues with the user device (e.g., issues that may result in a failure of a security standard or an organizational policy, even if not a technical error). Instead, only one of the conflicting settings (i.e., the setting from policy 520 or the setting from policy 550) may be executed/implemented on the user device.

Referring to FIG. 6, computer system 600 is a computer system/server 602 is shown in the form of a general-purpose computing device, according to some embodiments. The components of computer system/server 602 may include, but are not limited to, one or more processors or processing units 610, a system memory 660, and a bus 615 that couples various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random-access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the disclosure.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by a device management system, device management settings that the device management system is programmed to enforce for a device;
   receiving, by the device management system and from the device, source settings for the device received by the device from a second source different than the device management system;
   executing, by the device management system, a software algorithm that is configured to:
   identify and correlate corresponding settings from the device management settings and the source settings by analyzing individual words, strings, integers, and Booleans from the device management settings and the source settings;
   determine that the corresponding settings are conflicting settings;
   detect that the conflicting settings are priority settings;
   automatically apply, based on the detecting, the device management settings to the device; and
   generate an interface through the device management system that highlights the conflicting settings; and
   providing, by the device management system, a choice to select a setting between the conflicting settings on the interface, the selected setting chosen based on a predetermined precedence order for implementation on the device.

2. The method of claim 1, wherein the software algorithm is further configured to determine that the corresponding settings are conflicting settings by:
   determining, based on the analyzing, a similarity value of the corresponding settings; and
   comparing the similarity value to a conflict threshold.

3. The method of claim 2, further comprising:
   in response to determining that the similarity value is less than the conflict threshold, labelling the corresponding settings as conflicting settings.

4. The method of claim 3, further comprising:
   initially setting the conflict threshold as a predetermined value; and
   updating the conflict threshold using machine learning as additional data is gathered.

5. The method of claim 2, wherein the software algorithm is further configured to identify and correlate corresponding settings from the device management settings and the source settings by:
   determining, based on the analyzing, a correspondence value between each string of device management settings and string of source settings using machine learning and text analytics;
   comparing each correspondence value to a correspondence threshold that is different than the conflict threshold; and
   determining that a string of device management settings and a string of source settings with a correspondence value greater than or equal to a correspondence threshold are corresponding settings.

6. The method of claim 1, wherein the software algorithm is further configured to identify and correlate corresponding settings from the device management settings and the source settings by:
   determining, based on the analyzing, a correspondence value between each string of device management settings and string of source settings using machine learning and text analytics;
   comparing each correspondence value to a correspondence threshold; and
   determining that a string of device management settings and a string of source settings with a correspondence value greater than or equal to a correspondence threshold are corresponding settings.

7. The method of claim 1, wherein the software algorithm is further configured to detect that the conflicting settings are priority settings by:
   receiving a list of priority settings from a system administrator; and
   determining whether the conflicting settings are priority settings.

8. The method of claim 1, further comprising:
   generating a recommendation of a preferred setting, from the conflicting settings; and
   transmitting the recommendation to a system administrator.

9. The method of claim 1, wherein the source settings include settings from cache and settings from schema.

10. The method of claim 1, further comprising flagging the conflicts of the corresponding settings before the source settings are implemented on the device.

11. The method of claim 1, wherein the source settings are OEM settings.

12. The method of claim 1, further comprising:
receiving the choice from a user of the device; and
implementing respective ones of the conflicting settings in the device based on the choice of the user.

13. The method of claim 1, wherein:
the second source comprises a manufacturer of the device; and
the source settings received by the device from the second source are included in a software update to the device by the manufacturer of the device.

14. A system having one or more computer processors, the system configured to:
identify, by a device management system, device management settings that the device management system is programmed to enforce for a device;
receive, by the device management system and from the device, source settings for the device received by the device from a second source different than the device management system;
execute, by the device management system, a software algorithm that is configured to:
identify and correlate corresponding settings from the device management settings and the source settings by analyzing individual words, strings, integers, and Booleans from the device management settings and the source settings;
determine that the corresponding settings are conflicting settings;
detect whether the conflicting settings are priority settings;
automatically apply the device management settings to the device if the conflicting settings are priority settings;
automatically apply the source settings to the device if the conflicting settings are not priority settings; and
generate an interface through the device management system that highlights the conflicting settings; and
provide, by the device management system, a choice to select a setting between the conflicting settings on the interface, the selected setting chosen based on a predetermined precedence order for implementation on the device.

15. The system of claim 14, wherein the software algorithm is further configured to determine that the corresponding settings are conflicting settings by:
determining, based on the analyzing, a similarity value of the corresponding settings; and
comparing the similarity value to a conflict threshold.

16. The system of claim 14, wherein the software algorithm is further configured to identify and correlate corresponding settings from the device management settings and the source settings by:
determining, based on the analyzing, a correspondence value between each string of device management settings and string of source settings using machine learning and text analytics;
comparing each correspondence value to a correspondence threshold; and
determining that a string of device management settings and a string of source settings with a correspondence value greater than or equal to a correspondence threshold are corresponding settings.

17. The system of claim 14, wherein the software algorithm is further configured to detect whether the conflicting settings are priority settings by:
receiving a list of priority settings from a system administrator; and
determining whether the conflicting settings are priority settings.

18. A computer program product comprising a computer readable storage medium having program instructions embodied therewith, the program instructions executable by a server to cause the server to perform a method, the method comprising:
identifying, by a device management system, device management settings that the device management system is programmed to enforce for a device;
receiving, by the device management system and from the device, source settings for a device received by the device from a second source different than the device management system;
executing, by the device management system, a software algorithm that is configured to:
identify and correlate corresponding settings from the device management settings and the source settings by analyzing individual words, strings, integers, and Booleans from the device management settings and the source settings;
determine that the corresponding settings are conflicting settings;
detect that the conflicting settings are not priority settings;
automatically apply, based on the detecting, the source settings to the device; and
generate an interface through the device management system that highlights the conflicting settings; and
providing, by the device management system, a choice to select a setting between the conflicting settings on the interface, the selected setting chosen based on a predetermined precedence order for implementation on the device.

19. The computer program product of claim 18, wherein the software algorithm is further configured to determine that the corresponding settings are conflicting settings by:
determining, based on the analyzing, a similarity value of the corresponding settings; and
comparing the similarity value to a conflict threshold.

20. The computer program product of claim 18, wherein the software algorithm is further configured to identify and correlate corresponding settings from the device management settings and the source settings by:
determining, based on the analyzing, a correspondence value between each string of device management settings and string of source settings using machine learning and text analytics;
comparing each correspondence value to a correspondence threshold; and
determining that a string of device management settings and a string of source settings with a correspondence value greater than or equal to a correspondence threshold are corresponding settings.

* * * * *